United States Patent [19]

Matthes

[11] 4,309,969
[45] Jan. 12, 1982

[54] INDUCTION SYSTEM WITH HIGH-SWIRL INTAKE VALVE

[75] Inventor: William R. Matthes, Troy, Mich.

[73] Assignee: General Motors Corporation, Detroit, Mich.

[21] Appl. No.: 130,843

[22] Filed: Mar. 17, 1980

[51] Int. Cl.$^3$ ............................................. F01L 3//06
[52] U.S. Cl. ....................... 123/188 VA; 123/188 M; 123/306; 123/90.28
[58] Field of Search .......... 123/90.28, 188 R, 188 AF, 123/188 M, 188 VA, 306

[56] References Cited

U.S. PATENT DOCUMENTS

| | | | |
|---|---|---|---|
| 1,418,911 | 6/1922 | Garlick | 123/188 VA |
| 1,471,955 | 10/1923 | Grieve | 123/188 VA |
| 1,540,031 | 6/1925 | Nette | 123/90.28 |
| 1,552,760 | 9/1925 | Rothenbucher | 123/90.28 |
| 1,552,761 | 9/1925 | Rothenbucher | 123/90.28 |
| 1,624,850 | 4/1927 | Steele | 123/188 VA |
| 1,638,585 | 8/1927 | Lathrop | 123/188 A |
| 1,812,262 | 6/1931 | Gardner et al. | 123/188 VA |
| 1,956,235 | 4/1934 | Hofferberth | 123/188 VA |
| 2,768,617 | 10/1956 | Tierney, Jr. et al. | 123/188 VA |
| 2,868,187 | 1/1959 | Meurer | 123/188 VA |
| 3,090,370 | 5/1963 | Kimball | 123/188 VA |
| 3,757,757 | 9/1973 | Bastenhof | 123/188 VA |
| 4,137,886 | 2/1979 | Hiramatsu | 123/188 M |

FOREIGN PATENT DOCUMENTS 465261  5/1937  United Kingdom ........ 123/188 VA

Primary Examiner—Craig R. Feinberg
Assistant Examiner—W. R. Wolfe
Attorney, Agent, or Firm—Arthur N. Krein

[57] ABSTRACT

An induction system for an internal combustion engine includes an intake port in the cylinder head of the engine with this intake port having a straight cylindrical wall portion terminating at an angular valve seat and, a high-swirl intake valve cooperating therewith to control the direction of flow of an induction charge into the associated combustion chamber of the engine. The high-swirl intake valve includes a head with a valve stem upstanding from the backside thereof and further includes means associated with the backside of the valve head to define a flow passage for an induction charge. This means includes a rim shroud upstanding from the back of the valve head for an angular extent of at least 180° to define the inlet opening for this flow passage and spaced apart directional vanes upstanding from the remaining portion of the valve back and, a semi-circular disc fixed to the top edge of these directional vanes so as to define the discharge outlet for this flow passage. The directional vanes are so located on the valve back whereby to effect a desired direction of flow out through this discharge opening. The outside diameter of the means defining this flow passage is slightly less than the inside diameter of the cylindrical wall portion of the intake port so as to be slidably received therein. Anti-rotation means are associated with the cylinder head and the high-swirl intake valve to prevent rotation of the latter.

3 Claims, 4 Drawing Figures

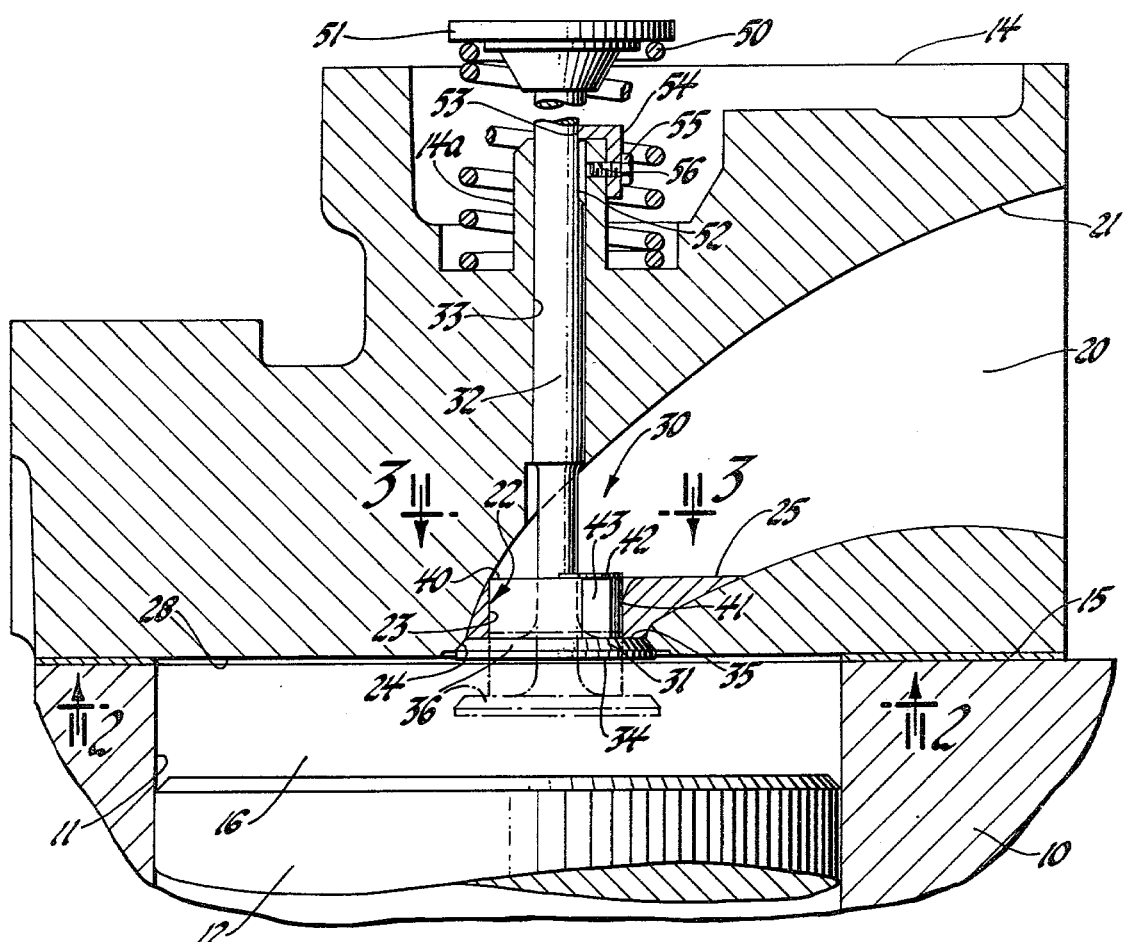

INDUCTION SYSTEM WITH HIGH-SWIRL INTAKE VALVE

FIELD OF THE INVENTION

This invention relates to an induction system for a reciprocating internal combustion engine and, in particular, to an intake valve and port arrangement of an induction system for such an engine.

More specifically, the invention relates to a high-swirl intake valve which cooperates with the intake port of an induction system whereby this valve is operative to control the direction of admission of an induction charge into the combustion chamber of an engine so as to create a high swirling motion of the induction charge within the combustion chamber.

BACKGROUND OF THE INVENTION

The desirability of generating swirling motion to an induction charge about the axis of an engine cylinder within a combustion chamber is well known. Such swirling motion produces a number of advantages in both the charge preparation within the combustion chamber and in the combustion of this charge within the combustion chamber. For example, in a conventional spark-ignition homogeneous engine operation, increasing swirl rate (usually defined as the ratio of in-cylinder charge rotative speed to engine rotative speed) has generally increased the burning rate and resulted in decreased fuel consumption. In stratified charge engines, some amount of swirl is also employed to promote mixing between the rich core of fuel and the surrounding air in order to reduce exhaust emission and fuel consumption. High swirl rates may also be beneficial to maintaining a centrally located fuel-air cloud in certain types of stratified charge engines. Swirl is also used in diesel engines to promote fuel-air mixing for lower $NO_x$ emissions and soot formation.

Various structural arrangements have been proposed to induce such directional admission of an induction charge into the combustion chamber of an engine. The use of a spiral or sloped intake passage; the use of a baffle or shroud in or adjacent the inlet port; and, the use of a baffle or deflector on the intake valve are well known examples of such structural arrangements. While such prior art structures have been effective in producing moderate amounts of swirl, they are limited in performance with swirl numbers usually on the order of 3 to 4, with reference to the definition of swirl rate as given hereinabove.

SUMMARY OF THE INVENTION

The present invention relates to an improved induction system for an internal combustion engine and, in particular, to an improved non-rotating, high-swirl intake valve which cooperates with a straight walled cylindrical intake port whereby to control the direction of an induction charge into the combustion chamber of the engine. For this purpose the back of the head of the intake valve is provided with a semi-circular rim shroud defining an intake opening over at least approximately one half of the valve head, the remaining portion of the valve head being structurally arranged so as to define a discharge passage for the induction charge. A plurality of directional vanes are positioned in this discharge passage so that induction charge, upon opening movement of the intake valve, is directed into a combustion chamber in a direction substantially tangential to the associated cylinder wall forming part of the combustion chamber.

Accordingly, a primary object of the present invention is to provide an improved induction system for an internal combustion engine that utilizes a non rotatable, high-swirl intake valve movable in a straight walled cylindrical intake port to control discharge therefrom. The back of the head of the intake valve has means thereon defining a fluid passage with the discharge end thereof containing a plurality of directional vanes whereby an induction charge can be introduced into a combustion chamber in a direction substantially tangential to the cylindrical wall thereof.

Another object of the invention is to provide an improved induction system that includes an intake valve having passage means on the backside of its valve head to effect swirling motion of an induction charge flowing therethrough upon actuation of the intake valve relative to an intake port of the induction system.

Still another object of the present invention is to provide an improved intake valve for use in the intake port in an engine induction system, the intake valve upon actuation thereof being operative to effect high swirl generation of an induction charge delivered to an associated combustion chamber of the engine.

A still further object of the present invention is to provide an intake valve and intake port structural arrangement which is operative to generate a high swirling motion to an induction charge as it is introduced into an associated combustion chamber of an engine.

These and other objects of the invention are attained in an induction system that includes a straight walled cylindrical intake port opening into the combustion chamber of an engine and a non-rotating, high-swirl intake valve operatively associated with the intake port. The high-swirl intake valve includes a valve head having a stem extending from the backside thereof. The backside of the valve head is also provided with a semi-cylindrical rim shroud extending upward therefrom parallel to the axis of the valve stem, the rim shroud extending around approximately at least one half of the valve stem. A flat semi-circular disc extends from opposite ends of the rim shroud from the free upper edge thereof whereby this disc extends in a plane substantially parallel to the back face of the valve head at a predetermined distance therefrom. The rim shroud and disc form with the valve head a flow passage for induction fluid to be delivered to the combustion chamber upon actuation of the intake valve, with the rim shroud and disc forming the inlet and discharge ends respectively, of this flow passage. A plurality of spaced apart directional vanes extend upright from the valve back to the underside of the semi-circular disc to direct the discharge of an induction charge as desired. The abovedescribed elements on the backside of the valve head are slidably received in the straight cylindrical wall of the inlet port. Anti-rotation means are also associated with the intake valve and associated cylinder head to prevent rotation of the intake valve.

BRIEF DESCRIPTION OF THE DRAWING

For a better understanding of the invention, as well as other objects and further features thereof, reference is had to the following detailed description of the invention to be read in connection with the accompanying drawings, wherein:

FIG. 1 is a cross-sectional view of a portion of an internal combustion engine embodying the invention and showing the induction system outlet with a high-swirl intake valve and the adjacent portions of the associated cylinder and piston, the intake valve and piston being shown in elevation;

FIG. 2 is a partial lower plane view of a cylinder head incorporating the invention and showing a preferred position of the intake valve relative to the exhaust valve for the cylinder, the view being taken along a line corresponding to line 2—2 of FIG. 1;

FIG. 3 is a top view of the back of the intake valve of FIG. 1 taken along line 3—3 of FIG. 1; and, FIG. 4 is a perspective view of the lower portion of the high-swirl intake valve of FIGS. 1, 2 and 3.

DESCRIPTION OF THE PREFERRED EMBODIMENTS

Referring now to the drawings, there is illustrated a portion of an internal combustion engine having an engine cylinder block 10 with at least one cylinder 11 therein defined by an internal cylindrical bore wall formed in the cylinder block. The cylinder 11 reciprocably receives a piston 12. Closing the end of the cylinder is a cylinder head 14 that is suitably secured to the cylinder block 10 with the usual gasket 15 sandwiched therebetween. The cylinder 11, piston 12 and cylinder head 14 cooperate to define a variable volume combustion chamber 16.

As shown in FIG. 1, the cylinder head 14 is provided with an induction system that includes an induction passage 20 having an entrance portion 21 at its upstream end opening from an outer surface of the cylinder head 14 which is adapted to receive an inlet manifold (not shown). At its opposite end, the inlet passage terminates at an inlet or intake port 22 opening into the combustion chamber 16, with flow therefrom controlled by a high-swirl intake valve 30 in accordance with the invention.

Intake port 22 has an internal straight cylindrical wall portion 23 of circular cross section that terminates at an annular valve seat 24 which, in a conventional manner, is chamfered or beveled at a suitable angle to the axis of the intake port, as desired, on the side of the cylinder head adjacent to the cylinder block. The straight cylindrical wall portion 23 of the intake port 22 can be formed in the cylinder head 14 or, alternatively, as shown, this straight cylindrical wall portion 23 can be provided in an port insert 25 suitably fixed in the intake port of an otherwise conventional cylinder head. Thus in the construction shown, the straight cylindrical wall portion 23 of the intake port is provided by means of the insert 25 while the annular valve seat 24 is machined on the cylinder head 14.

As is conventional, the cylinder head 14 also includes an exhaust passage opening at an exhaust port 26, FIG. 2, into the cylinder 11 with an exhaust valve 27 controllably closing the exhaust port 26 end which opens through the firing face 28 of the cylinder head 14.

For purpose of illustration only, in the construction illustrated, both the intake port 22 and the exhaust port 26 are offset to one side from a central plane that passes through the axis of the cylinder 11. In addition, the engine illustrated is of the type having a flat cylinder head surface and thus a flat firing face 28, and both the axis of the inlet valve and the axis of the exhaust valve 27 are parallel to the axis of the cylinder 11.

The high-swirl intake valve 30, in accordance with the invention, made of suitable material for its intended function, includes a valve head 31, formed as a body of revolution around an axis, and an upstanding valve stem 32 concentric to the axis of the valve head. Valve stem 32 is movably carried in a valve guide bore 33 formed in the cylinder head 14 co-axial with the axis of the intake port 22. The head 31 of the intake valve 30 has a valve face 34 on one side thereof and a valve back 35 on the opposite side thereof from which the valve stem 32 extends. The valve back 35 is provided with an annular valve seating portion 36 thereon formed complimentary to the valve seat 24 whereby the head 31 is adapted for seating engagement therewith.

Upstanding from the back 35 of the valve head 31 is a thin walled, rim shroud 40 that extends around a predetermined circumferential extent of the head 31 radially inward from the outer peripheral edge of the head for a purpose which will become apparent. The preferred circumferential extent of this rim shroud is described in greater detail hereinafter. On the opposite side of the valve back 35 from the rim shroud 40 there is provided a plurality of upstanding, spaced apart directional vanes 41 and, fixed to the top of these directional vanes is a thin, flat semi-circular disc 42. This disc 42 is also fixed at opposite radial extending edge ends thereof to the opposite upper ends of the rim shroud 40.

The rim shroud 40 and the semi-circular disc 42 thus form with the back 35 of the valve head 31 a flow passage 43 for an induction charge, with the rim shroud 40, in effect, defining the inlet end of this flow passage while the back 35 of the valve head 31 and the semi-circular disc 42 defines the discharge end of the flow passage 43. The directional vanes 41 positioned in the discharge end of the flow passage 43 are used to direct and control the direction of the induction charge flow out through this discharge end.

The effective outside diameter of the combined rim shroud 40 and the disc 42, including the directional vanes 41, is suitably less than the inside diameter of the straight wall cylindrical portion 23 of the intake port 22 should be such as to permit these elements of the subject intake valve 30 to be slidably received therein while still permitting substantially all of an intake or induction charge to flow through the above-described flow passage 43. With this arrangement substantially all of an induction charge flowing into the combustion chamber 16 during a valve 30 opening event will flow through the abovedescribed flow passage 43 so that the direction of flow of this induction charge will be controlled by the subject intake valve in a manner to be described.

In a conventional manner, the stem 32 of the intake valve 30 extends outward a suitable distance from the top of the cylinder head 14 so as to permit actuation thereof in one axial direction by means of, for example, a rocker arm, not shown, engaging the free end of the stem. Axial movement of the valve 30 in the opposite direction is effected by means of a coiled spring 50 encircling the stem 32. As is conventional, one end of this coiled spring 50 abuts against the cylinder head 14 and the other end thereof engages a valve spring retainer cap 51 (FIG. 1) that is suitably locked in a known manner to the stem 32 adjacent to the free end thereof.

With reference to FIG. 1, the intake valve 30 is shown in solid lines in its closed position relative to the valve seat 24 while its open position relative to this valve seat is shown by the broken line outline view of this valve. Also as shown, when the intake valve is in its fully open position relative to the valve seat 24, the upper portion of the rim shroud 40 should be still slidably engaged and encircled by the straight wall cylindrical portion 23 of the associated intake port 22.

Suitable anti-rotation means are also associated with the intake valve 30 and with the cylinder head 14 so as to prevent valve rotation during opening and closing movement thereof and to thus maintain the desired orientation of the directional vanes 41, as described hereinafter, relative to the internal peripheral wall of the associated cylinder 11.

As an example of a suitable anti-rotation means, there is provided in the construction illustrated in FIG. 1, a suitable flat 52, machined for example, on the outer peripheral surface of the valve stem 32 intermediate the ends thereof. This flat 52 mates with a suitable guide flat 53 provided on a suitably contoured bracket 54 fixed to the cylinder head 14. As shown, bracket 54 is of L-shape in cross section, with one leg of the bracket 54 having the guide flat 53 at the free end thereof while the other leg thereof depends down over the cylindrical valve guide boss 14a of the cylinder head 14 and is attached thereto, as by a machine screw 55 threaded into a suitable internally threaded aperture 56 provided for this purpose in a wall of the valve guide boss 14a. It will be apparent to those skilled in the art that other suitable anti-rotation means may be provided to serve the same function as the above-described anti-rotation means.

Referring again to the subject high-swirl intake valve 30, in the particular construction illustrated and as best seen in FIGS. 2, 3 and 4, a number of the directional vanes 41 are of straight configuration while the remainder of the directional vanes 41 are of suitable bent configuration, as desired, whereby these directional vanes 41 can be arranged to effect the desired direction of flow of an induction charge into the combustion chamber 16 of the engine upon actuation of the intake valve.

In the particular embodiment of the intake valve shown, the directional vanes 41 are orientated 10° to 20° from a vertical plane intersecting the axis of the cylinder 11, with reference to FIG. 2. The purpose of this orientation of the directional vanes 41, is to insure that an induction charge, as it exits the intake valve 30 will flow in a direction nearly tangent to the internal peripheral bore wall surface of the cylinder 11 so that the resultant swirl is in a clockwise direction with reference to FIG. 2. By directing the induction charge into the combustion chamber 16 in a flow path that is directed substantially tangential to the internal peripheral bore wall of the cylinder 11 there is imparted a high swirl motion to the induction charge. In a particular embodiment constructed in accordance with the above teaching, swirl rate numbers on the order of 10 to 16, with reference to the definition of swirl rate as given hereinabove, were obtained, dependent on the induction charge flow rate.

The angular extent of the semi-circular disc 42 is predetermined for a particular engine application and should be determined on the basis of the flow area through the directional vanes 41 at maximum valve lift. The flow area through the inlet of the passage 43, that is the flow area parallel to the valve axis formed between the semi-circular disc 42 and the rim shroud 40 (opposite to the directional vanes 41) should be about the same as or slightly greater than the flow area through the directional vanes 41 at maximum lift. If this latter flow area is smaller, then a significant flow restriction can develop upstream of the intake valve and thereby reduce the overall flow coefficient as well as the swirl intensity. If this flow area is made substantially larger than the flow area through the directional vanes 41, then the effective turning length of the directional vanes 41 is correspondingly reduced, resulting in reduced swirl. Thus, this flow area, that is, the inlet flow area of passage 43 should be sized to essentially match or slightly exceed the flow area of the directional vanes 41, that is, the flow area through the discharge end of passage 43, at maximum valve lift.

Thus in the particular embodiment illustrated, for a predetermined valve lift for a particular engine, in order to obtain the above-described flow areas, the angular extent of the semi-circular disc 42 was 160° while the rim shroud 40 extended about the remaining 200° around the back 35 of the head 31 of the subject high-swirl intake valve 30.

It will now be apparent to those skilled in the art that the angular extent of the rim shroud 40 should preferably be at least 180° and, that the angular extent thereof can be at least as great as 200°, whereby the inlet flow area of passage 43 is at least as great as or slightly larger than the flow area through the discharge end of passage 43 at maximum valve lift in a particular engine application.

The embodiments of the invention in which an exclusive property or privilege is claimed are defined as follows:

1. An induction system for an engine of the type having a cylinder block with at least one cylinder therein, a piston reciprocable in the cylinder, and a cylinder head partly closing one end of the cylinder whereby to define with the cylinder and the piston a combustion chamber; said induction system including means in the cylinder head defining an intake passage having an internal straight cylindrical wall that terminates at an annular conical valve seat whereby to define an intake port to the combustion chamber, a valve stem guide bore in said cylinder head concentric with said conical valve seat; a swirl inducing poppet valve operatively associated with the cylinder head to control flow of an induction charge through said intake passage into the combustion chamber; said swirl inducing poppet valve including a head constituting a body of revolution about an axis and having a valve back on one side thereof with an annular valve seating portion thereon for seating engagement with said conical valve seat; a valve stem integral with and upstanding concentrically from said valve back reciprocably journaled in said valve stem guide bore; and means associated with said valve back to define therwith a passage for an induction charge, said valve back means including a plurality of spaced apart directional vanes upstanding from said valve back over approximately one half of said valve back with each of said directional vanes extending radially inward a predetermined distance from said valve seating portion, a semi-circular disc fixed to one side edge of said directional vanes in spaced apart parallel relationship to said valve back, and a segment of a cylindrical rim shroud upstanding from said valve back and connected at opposite ends to opposite radial extending edge ends of said semi-circular disc, the effective outside diameter of said valve back means being less than the inside diameter of said internal straight cylindrical wall of said intake port whereby said valve back means is reciprocably received therein, so that during opening movement of said swirl inducing poppet valve relative to said valve seat, wherein said means defining said induction charge passage forms a flow having substantially all of the induction charge flow through an inlet end of said induction charge passage defined by said rim shroud and out through a discharge end of said induction charge passage defined in part by said directional vanes so that the induction charge is directed into the combustion chamber in a direction substantially tangential to the cylindrical wall of the cylinder; and, anti-rotation means associated with said cylinder head and said valve stem to prevent rotation of said swirl inducing poppet valve.

2. An induction system for an engine of the type having a cylinder block with at least one cylinder therein, a piston reciprocable in the cylinder, and a cylinder head partly closing one end of the cylinder whereby to define with the cylinder and the piston a combustion chamber; said induction system including means in the cylinder head defining an intake passage for an induction charge, said intake passage having an intake upstream end with respect to the flow of an induction charge through said intake passage and a downstream end defined by an internal straight cylindrical wall of said cylinder head that terminates at an annular conical valve seat next adjacent to the cylinder whereby to define an intake port to the combustion chamber, a through valve stem guide bore in said cylinder head concentric with said conical valve seat; a swirl inducing poppet valve operatively associated with the cylinder head to control flow of an induction charge through said downstream end of said intake passage into the combustion chamber, said swirl inducing poppet valve including a head having a valve face on one side thereof and a valve back on the opposite side thereof with said valve back having an annular valve seating portion thereon adapted for seating engagement with said conical valve seat, a valve stem integral with and upstanding concentrically from said valve back reciprocably journaled in said valve stem guide bore; a segment of a cylindrical rim shroud upstanding from said valve back with an angular extent of from 180° to 200° around said valve back, a plurality of spaced apart directional vanes upstanding from said valve back over the remaining angular extent of said valve back with each of said directional vanes extending radially inward a predetermined distance from said valve seating portion to a vertical plane approximately intersecting the opposite ends of said rim shroud, a semi-circular disc fixed to one side edge of said directional vanes in spaced apart parallel relationship to said valve back and connected at opposite ends to the opposite upper ends of said rim shroud, the effective outside diameter of said rim shroud, said directional vanes and said semi-circular disc being less than the inside diameter of said internal straight cylindrical wall of said intake downstream end and an induction charge passage means comprising said rim shroud, said directional vanes and said semi-circular disc which are reciprocably received in said downstream end of the said intake passage so that during opening movement of said swirl inducing poppet valve relative to said valve seat, substantially all of the induction charge will flow through an opening defined by said rim shroud and out through a discharge passage defined in part by said directional vanes so that the induction charge is directed into the combustion chamber in a direction substantially tangential to the cylindrical wall of the cylinder; and, antirotation means associated with said cylinder head and said valve stem to prevent rotation of said poppet valve.

3. An induction system for an engine of the type having a cylinder block with at least one cylinder therein, a piston reciprocable in the cylinder, and a cylinder head partly closing one end of the cylinder whereby to define with the cylinder and the piston the combustion chamber; said induction system including means in the cylinder head defining an intake passage for an induction charge, said intake passage having an intake port at one end thereof opening into the combustion chamber, said intake port being defined by an internal straight cylindrical wall of said cylinder head that terminates at an annular conical valve seat next adjacent to the cylinder, a through valve stem guide bore in said cylinder head concentric with said conical valve seat; a swirl inducing poppet valve operatively associated with the cylinder head to control flow of an induction charge through said intake port into the combustion chamber, said swirl inducing poppet valve including a head having a face on one side thereof and a back on the opposite side thereof with said back of said valve head having an annular valve seating portion thereon adapted for seating engagement with said conical valve seat, a valve stem integral with and upstanding concentrically from said back of said valve head reciprocably journaled in said valve stem guide bore; a segment of a cylindrical rim shroud upstanding from said valve back so as to extend about at least one half of said back radially inward a predetermined distance from said valve seating portion, a plurality of spaced apart directional vanes upstanding from said valve back over the remaining portion of said back with each of said directional vanes extending radially inward a predetermined distance from said valve seating portion to a vertical plane approximately intersecting the opposite ends of said rim shroud, a semi-circular disc fixed to one side edge of said directional vanes in spaced apart parallel relationship to said valve back and connected at opposite ends to opposite upper edge ends of said rim shroud, the effective outside diameter of said rim shroud, said directional vanes and said semi-circular disc being less than the inside diameter of said internal straight cylindrical wall of said intake downstream end and an induction charge passage means comprising said rim shroud, said directional vanes and said semi-circular disc which are reciprocably received in said downstream end of the said intake passage, such that during opening movement of said swirl inducing poppet valve relative to said valve seat, substantially all of an induction charge will flow through an opening defined by said rim shroud and out through a discharge outlet defined by said directional vanes, said disc and said back so that the induction charge is directed into the combustion chamber in a direction substantially tangential to the cylindrical wall of the cylinder; and, anti-rotation means associated with said cylinder head and said valve stem to prevent rotation of said poppet valve.

* * * * *